(12) United States Patent
Spyra et al.

(10) Patent No.: US 11,008,962 B2
(45) Date of Patent: May 18, 2021

(54) INTERNAL COMBUSTION ENGINE

(71) Applicant: Innio Jenbacher GmbH & Co OG, Jenbach (AT)

(72) Inventors: Nikolaus Spyra, Tirol (AT); Lukas Undevall, Tirol (AT); Francisco Lopez, Jenbach (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 16/369,596

(22) Filed: Mar. 29, 2019

(65) Prior Publication Data

US 2020/0309047 A1    Oct. 1, 2020

(51) Int. Cl.
*F02D 41/00* (2006.01)
*F02B 39/10* (2006.01)
*F02B 37/16* (2006.01)

(52) U.S. Cl.
CPC .......... *F02D 41/0007* (2013.01); *F02B 39/10* (2013.01); *F02B 37/16* (2013.01); *F05D 2220/40* (2013.01)

(58) Field of Classification Search
CPC ...... F02D 41/0007; F02B 39/10; F02B 37/16; F05D 2220/40
See application file for complete search history.

(56) References Cited

U.S. PATENT DOCUMENTS

| | | | | |
|---|---|---|---|---|
| 2004/0216457 A1* | 11/2004 | Shea | .................. | F02D 41/0007 60/608 |
| 2005/0132705 A1* | 6/2005 | Boley | ..................... | F02B 37/16 60/605.1 |
| 2012/0292921 A1* | 11/2012 | Fahringer | ............. | F02D 31/001 290/40 B |
| 2016/0160868 A1* | 6/2016 | Xiao | ..................... | F04D 27/001 415/1 |
| 2017/0107924 A1* | 4/2017 | Blythe | ................ | F02D 41/0007 |
| 2017/0370280 A1* | 12/2017 | Lock | .................. | G01L 19/0092 |

* cited by examiner

*Primary Examiner* — Brandon D Lee
(74) *Attorney, Agent, or Firm* — Fletcher Yoder, P.C.

(57) ABSTRACT

A system and method is provided for controlling operating of an engine having a turbocharger with a compressor and an exhaust turbine, wherein the compressor is configured to provide a boost pressure and operate stably in a stable operating range between a surge line and a choke line of a compressor map. A controller is configured to control an actuator to cause an operating point of the compressor to move along a predetermined path within a corridor along a safety zone in the compressor map. The safety zone extends along the surge line. The safety zone is selected to provide a distance between the surge line and the corridor that minimizes a reduction of the boost pressure such that a sufficient boost pressure is available after the network fault.

20 Claims, 2 Drawing Sheets

INTERNAL COMBUSTION ENGINE

BACKGROUND

The present invention concerns an internal combustion engine, and a genset having a generator driven by an internal combustion engine.

Turbochargers have long been used to compress air, a fuel-air mixture or pure fuel to a higher pressure level before being fed to the combustion chambers of the internal combustion engine.

The surge line of the compressor of the turbocharger indicates that limit at which, in the event of exceeding it, an unstable operation, e.g. a flow reversal, occurs through the compressor.

The choke line of the compressor of the turbocharger indicates that limit at which there is no mass flow through the compressor in case of reaching the limit.

External and internal influences can lead to the position of the operating point of the compressor changing, and even to the surge line being reached or exceeded. Aging of the turbocharger can also lead to such a behavior.

If the internal combustion engine is coupled with a generator to a genset, an important example of an external influence is a net fault in a power supply net connected to the genset. This can be for example a short circuit in at least one phase of the power supply net. This leads to an undervoltage and an overcurrent, which causes strong and rapid load changes with respect to the genset. Various national legal systems stipulate that the genset must remain connected to the energy supply net at least for a certain time in the event of a net ("low voltage ride through"—LVRT). Without protective measures, there may be disadvantageous effects on the genset.

Examples of internal influences are a damage at the turbocharger, misfiring with respect to at least one combustion chamber of the internal combustion engine, etc.

The object of the invention is to provide an internal combustion engine, which allows, even in case of influences, which, in the state of the art, cause the surge line of the compressor to be reached or exceeded, a stable operation of the turbocharger, and a genset with such an internal combustion engine.

BRIEF DESCRIPTION

This object is solved by embodiments of an internal combustion engine and a genset having the features described in detail below.

As the closed loop or open loop control device is designed to regulate or control the at least one actuator in such a way that reaching the surge line is prevented by the operating point of the at least one compressor, stable operation of the turbocharger is possible even in case of negative external or internal influences.

The closed loop or open loop control device may, for example, be a central closed loop or open loop control device of the internal combustion engine.

Naturally, the possible positions of the operating point in the compressor map are limited by the maximum mechanical limits of the turbocharger.

It is preferably provided that the at least two operating parameters of the turbocharger, which are measured by the measuring device, are selected as follows:
pressure ratio across the compressor
volume flow or mass flow through the compressor
rotation speed of the turbocharger or
parameters derived from these parameters.

It is preferably provided that at least one actuator is designed as a bypass valve, wastegate, variable valve train, throttle valve, inlet valve for air or a mixture after the compressor, as a variable turbine geometry, as an actuator for influencing the point of time of ignition, or for the shutdown of ignition devices for the combustion chambers, or as an actuator for influencing the quantity or point of time of injecting liquid or gaseous fuel into the combustion chambers.

It is preferably provided that the closed loop or open loop control device is designed in such a way that, if the operating point moves caused by external influences, reaching the surge line by the operating point is prevented.

For this, a signaling device may be provided, which is connectable to a power supply net, and is designed to send a signal to the closed loop or open loop control device when a net fault of the power supply net is detected, whereby the closed loop or open loop control device is designed in such a way that, when such a signal is received, an activation of the at least one actuator is to be carried out as to prevent the operating point from reaching the surge line due to measures taken by the closed loop or open loop control device which serve to handle the net fault (in general: reduction of the output of the internal combustion engine, e.g. suspension of ignition or setting the ignition to "late").

This bears a number of advantages:
The probability of reaching or exceeding the surge line during the LVRT is reduced.
The negative effects of a net fault during an LVRT regarding the turbocharger are reduced.
Longer durations of the LVRT are possible.
During the LVRT there is a lower power loss of the internal combustion engine as the functionality of the turbocharger is less impaired.
Generators with a lower moment of inertia than previously possible can be used.

It is preferably provided that the closed loop or open loop control device is designed to prevent the surge line being reached by the operating point if the operating point moves caused by an internal influence (e.g. damage at the turbocharger, misfire with respect to at least one combustion chamber of the internal combustion engine).

It is preferably provided that the closed loop or open loop control device is designed to prevent the surge line being reached by the operating point if the operating point moves caused by ageing of the compressor.

It is preferably provided that the closed loop or open loop control device is designed to cause the operating point to move along a predetermined path in the compressor map via the at least one actuator.

It may thereby be provided that the closed loop or open loop control device is designed to cause the operating point to move along a predetermined path in the compressor map at least approximately parallel to the surge line via the at least one actuator. The closer the operating point remains to the surge line, the lower is the drop in output of the turbocharger, and thus of the internal combustion engine, because the boost pressure of the air, the fuel-air mixture or the pure fuel (depending on the design of the internal combustion engine, e.g. gas engine with mixture charging, gas engine with port injection, internal combustion engine with injection of liquid fuel, dual-fuel internal combustion engine) drops less strongly.

It may be provided that the closed loop or open loop control device is designed to cause the operating point to move along a predetermined path within a corridor arranged in front of the surge line, preferably over a safety zone, via at least one actuator.

It is preferably provided that the closed loop or open loop control device is designed to calculate the activation of the at least one actuator in dependence on a compressor model.

The way of calculation is taught, for example, in the following text books:

Hermann Hiereth, Peter Prenninger, Aufladung der Verbrennungskraftmaschine-Der Fahrzeugantrieb/chapter 5, 2003, published by Springer/Vienna Gunther P. Merker, Rudiger Teichmann, Grundlagen Verbrennungsmotoren (Funktionsweise-Simulation-Messtechnik)/chapter 5 (Aufladesysteme), 7th, completely revised edition, 2014, published by Springer/Vienna Gunther P. Merker, Christian Schwarz, Grundlagen Verbrennungsmotoren (Simulation der Gemischbildung, Verbrennung, Schadstoffbildung and Aufladung)/chapter 8 (Aufladung von Verbrennungsmotoren) 4th, revised and updated edition Vieweg+Teubner, GWV Fachverlage GmbH, Wiesbaden 2009

It is preferably provided that the closed loop or open loop control device is designed to activate the at least one actuator depending on a pre-defined table. The table can be based on empirical values or created on a test stand.

The invention can preferably be used with a stationary internal combustion engine, for marine applications or mobile applications, such as so-called "non-road mobile machinery" (NRMM), preferably in each case designed as a reciprocating piston engine. The internal combustion engine can serve as a mechanical drive, e.g. for operating compressor systems, or can be coupled with a generator to form a genset for generating electrical power. The internal combustion engine preferably has a large number of combustion chambers.

BRIEF DESCRIPTION OF THE DRAWINGS

Embodiments of the invention are discussed using the figures. They show.

DETAILED DESCRIPTION

Figure 1:
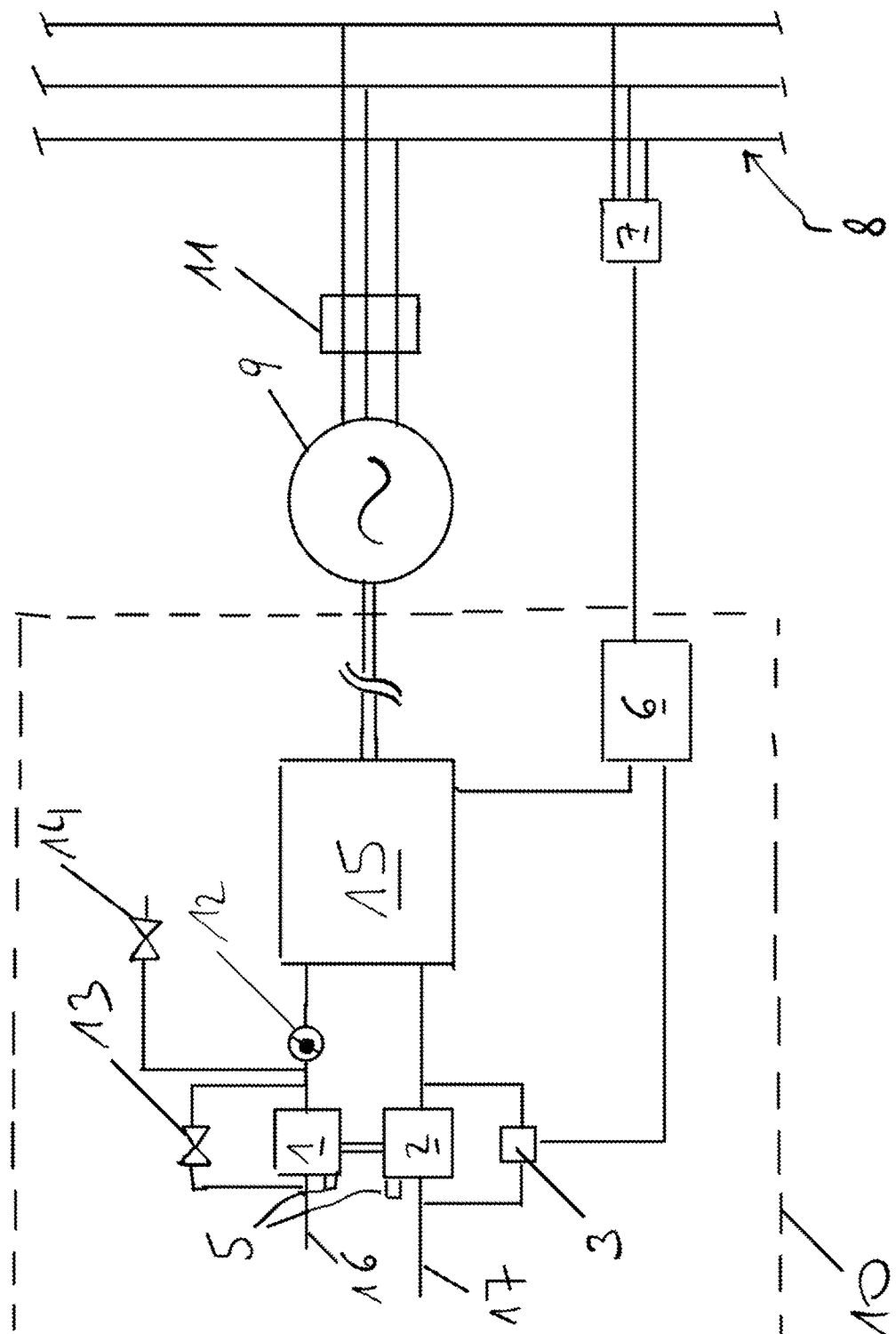
FIG. 1 a schematic illustration of an internal combustion engine according to the invention FIG. 2 a compressor map of a turbocharger of an internal combustion engine according to the invention.

FIG. 1 shows an internal combustion engine 10 with a plurality 15 of combustion chambers (if necessary connected with pre-chambers) shown only schematically, with not shown fuel supply facilities to the individual combustion chambers (e.g. inlet valves or active gas valves, port injection valves, injectors for liquid fuel, etc.), a turbocharger, which has a compressor 1 and an exhaust turbine 2, etc. An inlet tract 16 and an outlet tract 17 for air or a fuel-air mixture are shown.

Actuators for setting an operating point 4 of the turbochargers in the compressor map are shown as examples, namely a throttle valve 12, a bypass valve 13, an inlet valve 14, and a wastegate 3. Further actuators can be provided with respect to the plurality 15 of combustion chambers (e.g. actuators for influencing the point of time of ignition or for shutdown of ignition devices for the combustion chambers, actuators for influencing the quantity or point of time of injecting liquid or gaseous fuel into the combustion chambers).

A measuring device 5 is provided for measuring at least two operating parameters of the turbocharger (here: pressure ratio across compressor 1, volume flow or mass flow through compressor 1 or rotational speed of the turbocharger) by means of which a position of an operating point 4 of the turbocharger in the compressor map is determinable.

A closed loop or open loop control device 6 is connected to the measuring device 5 (the connections are not shown), and designed to activate the actuators 3. The closed loop or open loop control device 6 is designed here as the central closed loop or open loop control unit for the entire internal combustion engine 10, and can also receive measured data from the plurality 15 of combustion chambers (including the assigned components such as active gas valves, pressure in supply lines, etc.), as well as issue commands to the plurality 15 of combustion chambers or the assigned components, respectively.

For generating power, the internal combustion engine 10 is mechanically connected (via a shaft) to a generator 9 to form a genset, and is electrically connected to a three-phase power supply net 8. A signaling device 7 is provided, which is connected or connectable to the power supply net 8, and is designed to transmit a signal to the closed loop or open loop control device 6 upon detection of a net fault of the power supply net 8, whereby the closed loop or open loop control device 6 is designed to activate the at least one actuator upon receiving such a signal in such a way that reaching the surge limit by the operating point is prevented which could be caused by means of measures (see the explanations to FIG. 2), which serve the handling of the net fault, in particular with respect to the LVRT (in general: reduction of the output of the internal combustion engine, e.g. suspension of ignition or setting of ignition to "late").

Figure 2:
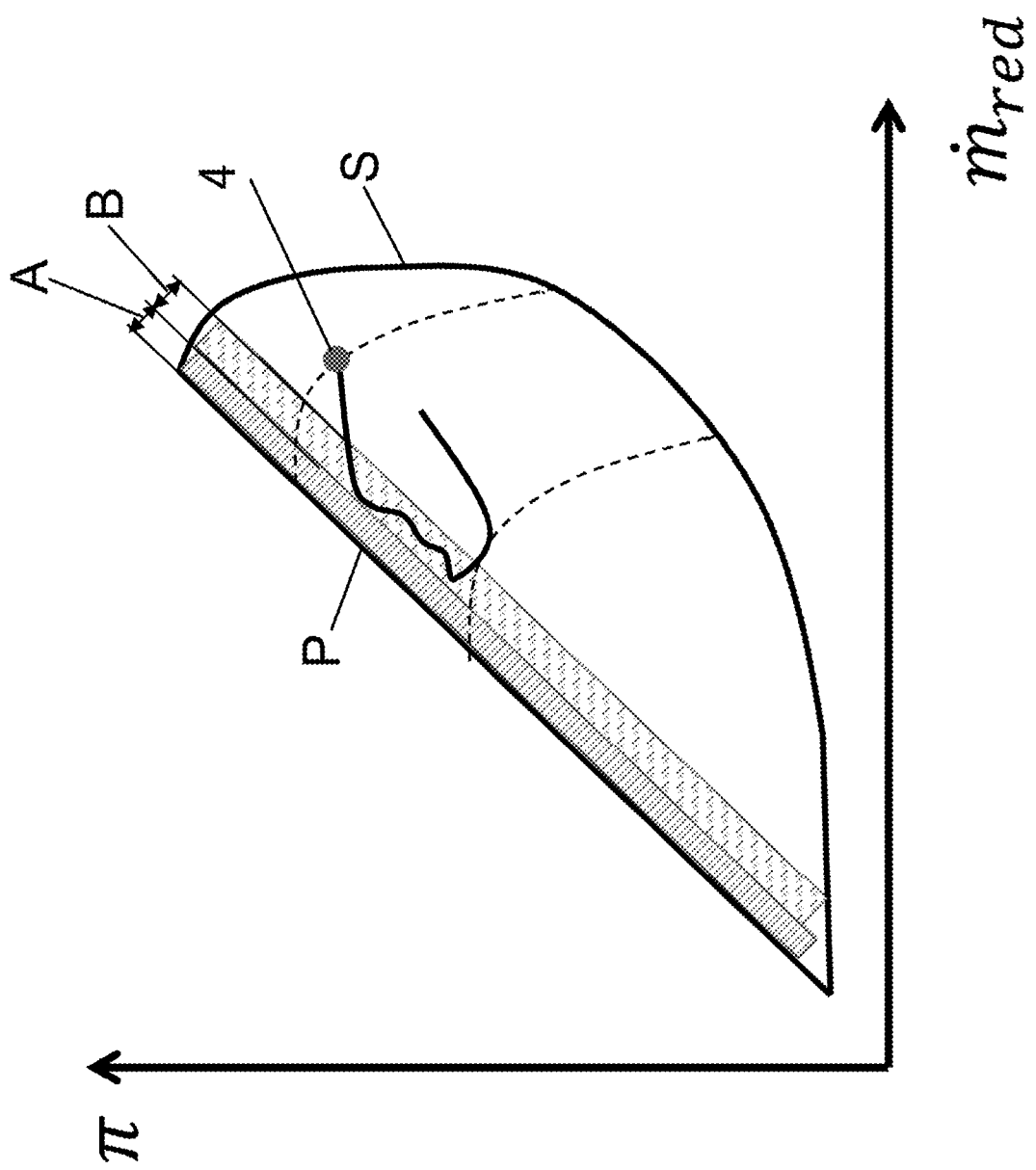

FIG. 2 shows a compressor map of compressor 1 of the turbocharger (ordinate: pressure ratio $\pi$ over compressor 1, abscissa: temperature- and pressure-compensated mass flow mred, whereby it can be seen that compressor 1 can be operated stably in a stable operating range, which stable operating range is limited by a surge line P on the one hand, and by a choke line S on the other hand. The dotted lines show isoreduced rotational speed lines (i.e. rotational speeds of the turbocharger compensated by the input temperature). Other than shown, the ordinate can also be plotted with the temperature- and pressure-compensated volume flow.

The operating point 4 is plotted in a position which is given in stable operation before a net fault occurs. Not shown are minor movements of the operating point 4 around the stable position, which can also occur during stable operation of the turbocharger.

If the signaling device 7 detects a net fault of the power supply net 8, it reports this to the closed loop or open loop control device 6. The closed loop or open loop control device 6 is designed to regulate or control the actuators in such a way as to prevent the surge line P being reached by the operating point 4 of compressor 1 of the at least one turbocharger despite the measures taken by the closed loop or open loop control device 6 for handling the net fault), and in particular with respect to the LVRT.

If the operating point 4 reaches corridor B, the closed loop or open loop control device 6, via the actuators, causes the operating point 4 to move along a specified path within corridor B, which over a safety area A is located in front of the surge line P. Corridor B, and thus the path, run at least approximately parallel to the surge line P. When the net fault has ceased, operating point 4 returns to its original position in the compressor map.

Safety zone A is selected in such a way that, on the one hand, a safe distance from the surge line P is maintained, and at the same time, on the other hand, not more boost pressure than necessary is reduced, so that sufficient boost pressure is available again after the net fault.

If the net fault lasts too long (e.g. if the so-called "clearing time" is exceeded), the connection between the genset and the power supply net 8 can be disconnected by a net switch 11.

LIST OF REFERENCE SIGNS

1 compressor of the turbocharger
2 exhaust turbine of the turbocharger
3 wastegate
4 operating point of the turbocharger in the compressor
5 measuring device for measuring at least two operating parameters of the turbocharger
6 closed loop or open loop control device
7 signaling device connected to the power supply net
8 power supply net
9 generator
10 internal combustion engine
11 power switch
12 throttle valve
13 bypass valve
14 inlet valve
15 plurality of combustion chambers
16 inlet tract
17 exhaust tract

The invention claimed is:

1. A system, comprising:
   at least one turbocharger configured to couple to an internal combustion engine, wherein the at least one turbocharger comprises a compressor and an exhaust turbine, and the compressor is configured to provide a boost pressure and operate stably in a stable operating range between a surge line and a choke line of a compressor map;
   at least one actuator configured to adjust an operating point of the compressor in the compressor map;
   at least one sensor configured to measure one or more operating parameters of the turbocharger to enable a determination of a position of the operating point of the compressor in the compressor map;
   a transmitter configured to transmit a signal in response to detection of a network fault of an energy supply network; and
   a controller connected to the at least one sensor, wherein the controller, in response to the signal from the transmitter, is configured to control the at least one actuator to prevent the operating point from reaching the surge line as the operating point moves in the compressor map due to one or more measures taken by the controller to handle the network fault, wherein the controller is configured to control the at least one actuator to cause the operating point to move along a predetermined path within a corridor along a safety zone in the compressor map, wherein the safety zone extends along the surge line, and the safety zone is selected to provide a distance between the surge line and the corridor that minimizes a reduction of the boost pressure such that a sufficient boost pressure is available after the network fault.

2. The system according to claim 1, wherein the one or more operating parameters of the turbocharger are selected from:
   a pressure ratio across the compressor;
   a volume flow or a mass flow through the compressor; or
   a rotational speed of the turbocharger.

3. The system according to claim 1, wherein the at least one actuator comprises at least one of: a bypass valve of the compressor, a wastegate of the exhaust turbine, a variable valve train, a throttle valve, an inlet valve configured to adjust a supply of air or a mixture downstream of the compressor, a variable turbine geometry, an ignition actuator configured to adjust an ignition time or a shutdown of ignition devices for combustion chambers of the internal combustion engine, or a fuel injection actuator configured to adjust a quantity or a point of time of injecting liquid or gaseous fuel in the combustion chambers.

4. The system according to claim 1, comprising the internal combustion engine, wherein the exhaust turbine is disposed along an outlet tract of the internal combustion engine, and the compressor is disposed along an inlet tract of the internal combustion engine.

5. The system according to claim 4, comprising a generator driven by the internal combustion engine, wherein the generator is configured to provide energy to the energy supply network.

6. The system according to claim 1, wherein the controller is configured to control the at least one actuator to prevent the operating point from reaching the surge line when the operating point moves caused by a misfire with respect to at least one combustion chamber of the internal combustion engine.

7. The system according to claim 1, wherein the controller is configured to control the at least one actuator to prevent the operating point from reaching the surge line when the operating point moves in the compressor map caused by aging of the compressor.

8. The system according to claim 1, wherein the safety zone is parallel to the surge line, and the corridor is parallel to the surge line.

9. The system according to claim 1, wherein the predetermined path is at least approximately parallel to the surge line in the compressor map.

10. The system according to claim 1, wherein the controller is configured to perform:
    a first control comprising the one or more measures to handle the network fault; and
    a second control of the at least one actuator to prevent the operating point from reaching the surge line as the operating point moves toward the surge line in the compressor map due to the first control comprising the one or more measures taken by the controller to handle the network fault.

11. The system according to claim 1, wherein the controller is configured to calculate an activation of the at least one actuator in dependence on a compressor model.

12. The system according to claim 1, wherein the controller is configured to activate the at least one actuator in dependence on a pre-defined table.

13. The system according to claim 1, wherein the controller is configured to control the at least one actuator to prevent the operating point from reaching the surge line when the operating point moves caused by damage at the turbocharger.

14. The system according to claim 1, wherein the one or more measures taken by the controller to handle the network fault comprise at least one of: reducing an output of the internal combustion engine, suspending an ignition of the internal combustion engine, or setting the ignition to late.

15. A system, comprising:
a controller configured to control operation of an internal combustion engine having a turbocharger with a compressor and an exhaust turbine, wherein the compressor is configured to provide a boost pressure and operate stably in a stable operating range between a surge line and a choke line of a compressor map;
wherein the controller is configured to:
receive sensor feedback indicative of one or more operating parameters of the turbocharger to enable a determination of a position of an operating point of the compressor in the compressor map;
receive a signal indicative of a network fault of an energy supply network; and
control at least one actuator to adjust the operating point of the compressor in the compressor map in response to the signal, wherein the control prevents the operating point from reaching the surge line as the operating point moves in the compressor map due to one or more measures taken by the controller to handle the network fault, wherein the controller is configured to control the at least one actuator to cause the operating point to move along a predetermined path within a corridor along a safety zone in the compressor map, wherein the safety zone extends along the surge line, and the safety zone is selected to provide a distance between the surge line and the corridor that minimizes a reduction of the boost pressure such that a sufficient boost pressure is available after the network fault.

16. The system according to claim 15, comprising the turbocharger having the compressor and the exhaust turbine.

17. The system according to claim 16, comprising the internal combustion engine having the turbocharger.

18. The system according to claim 15, comprising one or more sensors configured to obtain the sensor feedback and a transmitter configured to transmit the signal to the controller.

19. The system according to claim 15, wherein:
the one or more measures taken by the controller to handle the network fault comprise at least one of: reducing an output of the internal combustion engine, suspending an ignition of the internal combustion engine, or setting the ignition to late; and
the at least one actuator comprises at least one of: a bypass valve of the compressor, a wastegate of the exhaust turbine, a variable valve train, a throttle valve, an inlet valve configured to adjust a supply of air or a mixture downstream of the compressor, a variable turbine geometry, an ignition actuator configured to adjust an ignition time or a shutdown of ignition devices for combustion chambers of the internal combustion engine, or a fuel injection actuator configured to adjust a quantity or a point of time of injecting liquid or gaseous fuel in the combustion chambers.

20. A method, comprising:
controlling, via a controller, operation of an internal combustion engine having a turbocharger with a compressor and an exhaust turbine, wherein the compressor is configured to provide a boost pressure and operate stably in a stable operating range between a surge line and a choke line of a compressor map;
wherein controlling the operation comprises:
receiving sensor feedback indicative of one or more operating parameters of the turbocharger to enable a determination of a position of an operating point of the compressor in the compressor map;
receiving a signal indicative of a network fault of an energy supply network; and
controlling at least one actuator to adjust the operating point of the compressor in the compressor map in response to the signal, wherein controlling the at least one actuator comprises preventing the operating point from reaching the surge line as the operating point moves in the compressor map due to one or more measures taken by the controller to handle the network fault, wherein controlling the at least one actuator comprises causing the operating point to move along a predetermined path within a corridor along a safety zone in the compressor map, wherein the safety zone extends along the surge line, and the safety zone is selected to provide a distance between the surge line and the corridor that minimizes a reduction of the boost pressure such that a sufficient boost pressure is available after the network fault.

* * * * *